United States Patent
Choubey et al.

(10) Patent No.: US 10,120,872 B2
(45) Date of Patent: Nov. 6, 2018

(54) DATA CACHING BASED ON REQUESTOR IDENTITY

(71) Applicant: Facebook, Inc., Menlo Park, CA (US)

(72) Inventors: Neeraj Choubey, Belmont, CA (US); Fraidun Akhi, Fremont, CA (US); Georgiy Yakovlev, Pacifica, CA (US); Ray Joseph Tong, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 339 days.

(21) Appl. No.: 14/980,255

(22) Filed: Dec. 28, 2015

(65) Prior Publication Data

US 2017/0185619 A1 Jun. 29, 2017

(51) Int. Cl.
 G06F 7/02 (2006.01)
 G06F 17/30 (2006.01)
 H04L 29/08 (2006.01)

(52) U.S. Cl.
 CPC .... G06F 17/30132 (2013.01); G06F 17/3048 (2013.01); G06F 17/30867 (2013.01); G06F 17/30902 (2013.01); H04L 67/2842 (2013.01); H04L 67/2852 (2013.01)

(58) Field of Classification Search
 CPC .......... G06F 17/30902; G06F 17/3048; G06F 17/3053; G06F 17/30117; G06F 17/30; G06F 17/30867; H04L 67/2852; H04L 67/2842
 See application file for complete search history.

(56) References Cited

U.S. PATENT DOCUMENTS

| | | | | |
|---|---|---|---|---|
| 2002/0133673 A1* | 9/2002 | Jeddeloh | ............. | G06F 12/0888 711/138 |
| 2010/0281035 A1* | 11/2010 | Carmel et al. | .... | G06F 17/30864 707/749 |
| 2013/0325942 A1* | 12/2013 | Chen et al. | ......... | H04L 65/4084 709/204 |
| 2014/0317186 A1* | 10/2014 | Niemi | .................... | G06Q 10/10 709/204 |
| 2017/0171100 A1* | 6/2017 | Liu | .......................... | H04L 47/70 |

OTHER PUBLICATIONS

Pandya et al ("Distributed Cooperative Caching in Social Wireless Network," International Journal of Engineering Research and Applications, vol. 4 Issue 4, Apr. 2014. (Year: 2014).*

* cited by examiner

*Primary Examiner* — Bruce M Moser
(74) *Attorney, Agent, or Firm* — FisherBroyles, LLP

(57) ABSTRACT

Several embodiments include a data cache system that implements a data cache and processes content requests for data items that may be in the data cache. The data cache system can receive a content request for at least one data item. The data cache system can update a karma score associated an originator entity of the data item. The originator entity can be a user account that uploaded the data item. When wiping the data cache for more storage space, the data cache system can determine whether to discard the data items based on a cache priority that is computed based, at least partially, on the karma score.

20 Claims, 6 Drawing Sheets

US 10,120,872 B2

DATA CACHING BASED ON REQUESTOR IDENTITY

BACKGROUND

A wide area network (WAN) can connect a local area network (LAN) established by an Internet service provider (ISP) to a data center outside of the LAN. A WAN may employ network appliances and content delivery networks (CDNs) as cache systems to reduce the likelihood of network traffic causing bottlenecks at the data centers. The cache systems can store popular content, e.g., a video or photo that is requested by many users in locations that are closer to the users than the data centers, in terms of geographic distance, network distance ("hops") or both. A "cache hit" occurs when requested data can be found in a cache, whereas a "cache miss" occurs when it cannot. Having a high cache "hit rate" lowers the latency of delivering the content to the user and also reduces the bandwidth requirement because the requested data has to travel a smaller distance than from the data center.

Having network appliances and CDNs as close as possible to end users can significantly speed up network communication and reduce network congestion. However, network appliances and CDNs are expensive because they tend to utilize computationally powerful devices because they implement highly complex caching algorithms and potentially provide service to a very large number of end-user devices. The network appliances and the CDNs require powerful computing devices with high network throughput, high processing power, high hardware and operating system reliability, and a large amount of memory (e.g., both system memory and persistent memory). These requirements make it difficult to implement the network appliances and the CDNs near "extreme" network-edges of the WAN (e.g., closer to end-user devices than traditional network appliances and CDNs). That is, there are usually insufficient resources (capital and/or technological) to implement that many high-complexity computing systems in every remote location that may have an end-user.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Embodiments are disclosed for a caching system at a network-edge (e.g., close to the end user devices) of a wide area network. The caching system can fill up a local cache implemented in one or more data storage devices until the local cache is full. Once the local cache is full, the caching system can cull its content until the local cache has a threshold amount (e.g., 20%) of space freed up for further caching. The culling of the content within the local cache can be in accordance with a caching algorithm disclosed herein.

In various embodiments, the caching algorithm determines which data item to discard when culling is needed. For example, the caching algorithm can determine a cache priority of a data item (e.g., a video content object) based on various "dynamic components." For example, the dynamic components can include a temporal component (e.g., that decays by the passing of time), a "karma" component (e.g., that increases based on the diversity of downloaders/content requesters), an access frequency component (e.g., that increases with the number of downloads), other components, or any combination thereof. In some embodiments, to determine the cache priority, the caching algorithm can also take into account metadata attributes of a file to be cached (e.g., file size, timestamp, file type, or any combination thereof), wherein the file corresponds to the data item. The caching system can update the dynamic components of the cache priority periodically or as new data requests come into the caching system.

In some embodiments, a peer local cache or a higher-level cache system (e.g., a network cache appliance) can pre-populate content objects into the local cache. For example, the peer local cache or the higher-level cache system can determine whether to pre-populate content objects based on user-specific access history, regional access history, social network of end-users for the caching system receiving the pre-populated content objects, or any combination thereof. In some embodiments, the caching system can share at least the dynamic components of the cache priority with a peer local cache or a higher-level cache system. In some embodiments, the caching system can receive updates to its dynamic components from a peer local cache or a higher-level cache system.

In some embodiments, the caching system is designed with minimal computational resource requirements as compared to a network cache appliance or a CDN system that has a large amount of memory. In some embodiments, the caching system can be a consumer-grade computer or a low-end computer server.

Figure 1:
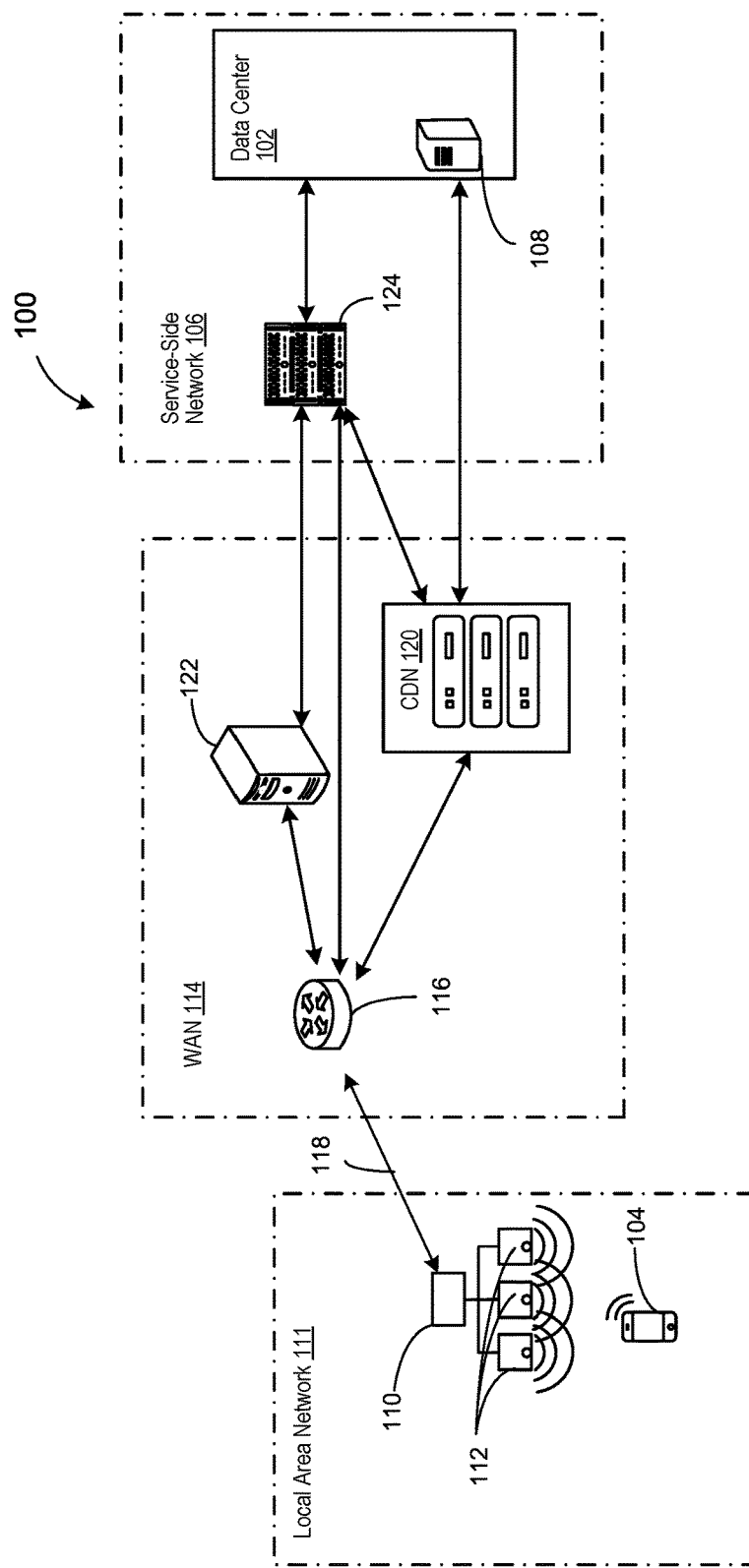
FIG. 1 is a block diagram illustrating a network environment in which a network-edge data cache may operate, in accordance with various embodiments.

Turning now to the figures, FIG. 1 is a block diagram illustrating a network environment 100 in which a network-edge data cache may operate, in accordance with various embodiments. The network environment 100 can include one or more network appliances, equipment, and servers for delivering content from a data center 102 to end-user devices (e.g., an end-user device 104). The data center 102 can include one or more computing devices providing data content for a content provider system (e.g., a social networking system, an application service system, a social media system, or any combination thereof). The data center 102 can be part of a service-side network 106 of the content provider system. The data center 102 can include an origination server 108. The origination server 108 can store data content made accessible through an application service.

A local hotspot system 110 can include one or more computing devices to host a local area network (LAN) 111. The local hotspot system 110 can be coupled to one or more access points 112. At least one of the access points 112 can connect the end-user device 104 to the LAN 111. The local hotspot system 110 can also provide access to a wide area network (WAN) 114. The LAN 111 can be connected to an Internet service provider (ISP) gateway system 116 via a backhaul link 118. The ISP gateway system 116 can include one or more computing devices to provide a network node equipped for connecting one or more local hotspot systems to the WAN 114. The WAN 114 can be an external network from the content provider system, e.g., the Internet. The WAN can provide network connections between the LAN 111 and the data center 102. In several embodiments, the network-edge data cache can be implemented in the ISP gateway system 116 or the local hotspot system 110.

The end-user device 104 can generate a content request (not illustrated). The end-user device can be a handheld computing device (e.g., mobile phone) or a larger computing device. When the content request from the end-user device 104 arrives at the network-edge data cache, the network-edge data cache can look-up the requested data item in its data cache to determine whether there is a cached copy. When there is a cache miss at the network-edge data cache (meaning that the cache does not presently store the requested item), the network-edge data cache can check with a content delivery network (CDN) 120 or a network cache appliance 122 to determine whether there is a cached copy of the requested data item. When the CDN 120 has a copy of the requested data item, then the CDN 120 can fulfill the content request by delivering the requested content object to the end-user device 104 without passing the content request to the data center 102. When the CDN 120 does not have a copy, then the content request is propagated along the WAN 114 to the service-side network 106 of the content provider system to fetch the requested content object from, for example, the origination server 108. The CDN 120 can then cache the requested content object once it is returned from the origination server 108. In some embodiments, other caching network appliances (e.g., the network cache appliance 122) can be coupled to the ISP gateway system 116. In these embodiments, the network cache appliance 122 can provide the same functionalities as the CDN 120 to fulfill the content request.

An edge point of presence (PoP) 124 can be part of the service-side network 106 of the content provider system. The edge PoP 124 can act as a proxy for the data center 102 to serve data content to end-user devices (e.g., the end-user device 104) connected to the WAN 114. In some embodiments, an edge PoP is setup closer to groups of users, for example, based on geographical locations (e.g., countries). For example, the edge PoP 124 can serve data content to the network cache appliance 122 and/or directly to the ISP gateway system 116, and thus indirectly to the end-user device 104.

In various embodiments, when the CDN 120 or the network cache appliance 122 does not have a copy of the requested content object, the CDN 120 or the network cache appliance 122 requests a copy from the edge PoP 124 or directly from the data center 102. In some embodiments, the data center 102 or the network cache appliance 122 pre-populates data items into the network-edge data cache. For example, the pre-population of data items may be based on predictive analytics and/or data accesses history analytics. In some embodiments, different network-edge data caches can pre-populate data items to each other.

Figure 2:
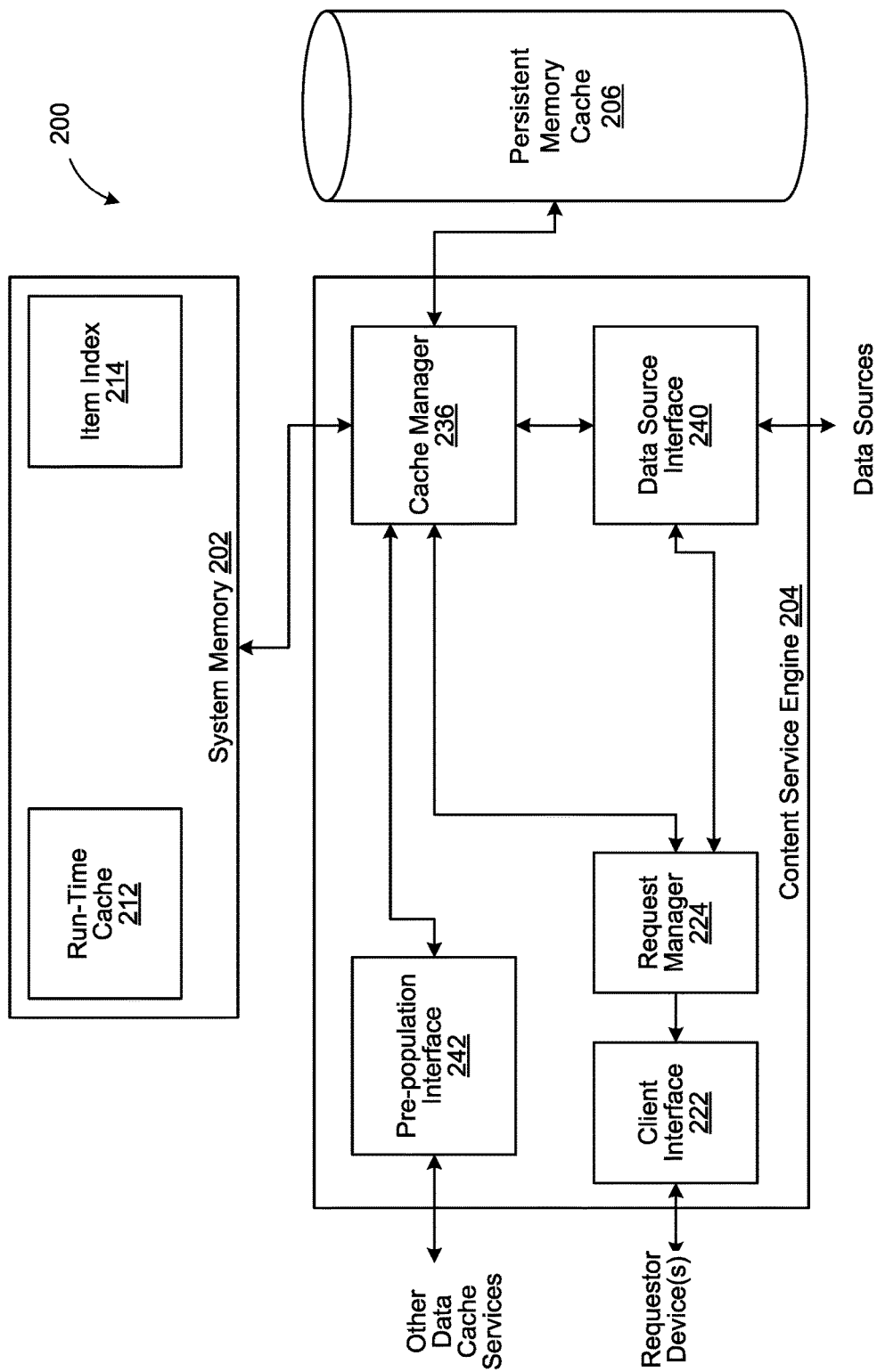
FIG. 2 is a block diagram illustrating functional and logical components of a data cache system, in accordance with various embodiments.

FIG. 2 is a block diagram illustrating functional and logical components of a data cache system 200, in accordance with various embodiments. The data cache system 200 can provide temporary data storage of content requested by one or more end-user devices (e.g., the end-user device 104) from a data center (e.g., the data center 102) that is accessible through a WAN (e.g., the WAN 114). The data cache system 200 can be the network-edge data cache discussed above. The data cache system 200 can be part of an ISP network establishing a LAN (e.g., the LAN 111) for a geographical region. The data cache system 200 can include one or more of a system memory 202 (e.g., hosted in system memory 304 of FIG. 3), a content service engine 204 (e.g., implemented by one or more processors 302 of FIG. 3), and a persistent memory cache 206 (e.g., hosted in data storage device 310 of FIG. 3).

The data cache system 200 can implement a run-time cache 212 in the system memory 202. The data cache system 200 can also implement an item index 214 that stores one or more item references corresponding to one or more data items (e.g., content objects and/or data files that have variable sizes) stored in the persistent memory cache 206. If the persistent memory cache 206 is accessible via a block-based protocol, each of the item references can point to one or more blocks in the persistent memory cache 206. A block-based protocol provides access to a data storage device via block identifier instead of a data item identifier or a file identifier. A computing device that employs the block-based protocol has to specifically write to data blocks or read from data blocks of the data storage device.

The item index 214 can maintain a list of data items stored in the persistent memory cache 206. In some embodiments, the item index 214 stores key-value pairs for quick determination of a location of a data item in the persistent memory cache 206. For example, the key for each data item can be a uniform resource locator (URL) of the data item and the value for each data item can be a memory location of the data item in the persistent memory cache 206. In some embodiments, the item index 214 stores only the keys so that the data cache system 200 can quickly determine what data items are stored in the persistent memory cache 206.

The item index 214 can store static attributes of the data items. For example, the static attributes of a data item can include one or more item identifiers, one or more requestor device identifiers, one or more requester user account identifiers, one or more URLs associated with the data items, a download timestamp, file sizes, file types, or any combination thereof. A download timestamp of a data item can be the timestamp associated with when the content service engine 204 retrieved the data item from an external data source. The item index 214 can also store dynamic attributes of the data items that varies throughout the time that the data items are stored in the data cache system 200. The dynamic attributes can include a cache priority associated with each data item. The dynamic attributes can include dynamic components (e.g., a temporal component, a karma component, an access frequency component, or any combination thereof) for calculating the cache priority. The dynamic attributes can include a last access timestamp of a data item. The last access timestamp can be a timestamp indicating when the content service engine 204 last provided (or updated) the data item in response to a content request.

The content service engine 204 can arrange and/or sort data items in the run-time cache 212 and the persistent memory cache 206 by one or more attributes of the data items maintained by the item index 214. In some embodiments, the content service engine 204 can arrange and/or sort the item index 214 by one or more attributes associated with the data items. For example, the content service engine 204 can arrange the data items by their download timestamps (e.g., last time the data items are downloaded into the data cache system 100), last access timestamps, file sizes, file types, cache priorities, one or more dynamic components of the cache priority, or any combination thereof. In some embodiments, the content service engine 204 arranges the data items according to the cache priority or components of the cache priorities to minimize latency associated with a cache lookup and with a cache wipe command (e.g., a command to initialize culling of at least a portion of the run-time cache 212 and/or the persistent memory cache 206).

A client interface 222 of the content service engine 204 can receive a content request from an external device (e.g., the end-user device 104). The content request can specify a data item identifier, a URL, or a combination thereof. The content request can also include metadata specifying a requestor device identifier, a requester user account identifier, a timestamp of when the content request is generated, or any combination thereof. A request manager 224 processes incoming content requests by extracting the data item identifier and/or the URL from the content requests. The request manager 224 can generate a cache lookup request based on a content request. The request manager 224 can send the cache lookup request to a cache manager 236 of the content service engine 204. The cache manager 236 can locate or attempt to locate data items identified in the cache lookup requests to respond to the cache lookup requests.

In response to a cache lookup request, the cache manager 236 can access the run-time cache 212 to determine whether or not a data item corresponding to the cache lookup request is stored in the run-time cache 212. In response to the cache lookup request, the cache manager 236 can also access the item index 214 to determine whether or not a data item corresponding to the cache lookup request is stored in the persistent memory cache 206.

When the requested data item is available in either the run-time cache 212 or the persistent memory cache 206, the cache manager 236 can generate a cache hit message for the request manager 224. The cache hit message can include the requested data item extracted from the run-time cache 212 or the persistent memory cache 206. In some embodiments, the cache manager 236 uses the item index 214 to locate the requested data item in the persistent memory cache 206 or at least to determine that the persistent memory cache 206 has the requested data item. In response to receiving a cache hit message, the request manager 224 can respond to the content request with the requested data item through the client interface 222.

When the requested data item is unavailable (e.g., neither in the run-time cache 212 nor the persistent memory cache 206), the cache manager 236 can generate a cache miss message to send back to the request manager 224. When the request manager 224 receives the cache miss message, the request manager 224 can forward the content request through a data source interface 240. The data source interface 240 provides a network interface for the data cache system 200 to communicate with a data center storing the requested data item or a proxy (e.g., a network cache appliance, a CDN, an edge PoP cache, or any combination thereof) for the data center. For example, the data source interface 240 can identify what data source(s) to contact based on a URL identified in the content request. Upon receiving the requested data item from the data center or the proxy of the data center, the request manager 224 can respond to the content request with the requested data item through the client interface 222.

The cache manager 236 can be configured to operate a storage adapter (e.g., storage adapter 308) to access input/output (I/O) of the persistent memory cache 206. For example, the cache manager 236 can write one or more new files or blocks into the persistent memory cache 206. In some embodiments, the cache manager 236 can save the requested data item received through the data source interface 240 in the run-time cache 212 and subsequently in the persistent memory cache 206. In some embodiments, the cache manager 236 can save the requested data item directly to the persistent memory cache 206 in response to receiving the requested data item through the data source interface 240.

Regardless of whether there is a cache hit or a cache miss, the cache manager 236 can update attributes of the requested data item in the item index 214. The cache manager 236 can update the dynamic components of the cache priority to the item index 214. The cache manager 236 can compute the cache priority of the requested data item based on the cache priority components and then update the cache priority of the requested data item to the item index 214. Details of how these updates are done are illustrated in at least FIGS. 4-7 and discussed in further detail below. The cache manager 236 can update metadata associated with the requested data item in the item index 214.

If a cache miss occurs, the cache manager 236 can generate a key-value pair or an entry in the list of keys for the requested data item once it stores the data item in the persistent memory cache 206. The data item identifier and/or the URL of the requested data item can be the designated key. In some embodiments, the designated key is a list of keys of different types, including the data item identifier and the URL. The cache manager 236 can store the memory location of the data item as the designated "value" in the generated key-value pair. The cache manager 236 can store metadata (e.g., a requestor device identifier, a requester user account identifier, a timestamp of when the content request is generated) from the content request in the item index 214. The cache manager 236 can store also metadata (e.g., the download timestamp, the file type, the file size, etc.), which becomes available after the data cache system 200 receives the requested data item through the data source interface 240, in the item index 214. Some of the metadata can be determined from the data item itself. In some embodiments, the cache manager 236 can initialize a cache priority and/or dynamic components of the cache priority in the item index 214.

If a cache hit occurs, the cache manager can update and store metadata (e.g., last access timestamp), the cache priority, one or more dynamic components of the cache priority, or any combination thereof, that are associated with the requested data item. Details of how some of these attributes are updated are illustrated in FIGS. 4-7 and discussed in further detail below.

In some embodiments, the cache manager 236 stores a backup copy of the item index 214 in a preset location in the persistent memory cache 206. In some embodiments, the cache manager 236 stores the item index 214 in the system memory 202 without a backup copy in the persistent memory cache 206. In these embodiments, when the data cache system 200 restarts (e.g., due to failure or error) and content of the system memory 202 is wiped (e.g., cleared from storage), the data cache system 200 can wipe the persistent memory cache 206 and rebuild the item index 214 from scratch. In some embodiments, the content of the system memory 202 is not wiped, and the data cache system 200 can recover the item index 214 from a backup copy in the persistent memory cache 206. In some scenarios, however, the content service engine 204 can recover the item index 214 from the system memory 202 despite a restart.

In some embodiments, the data cache system 200 can interact with other computing devices via a pre-population interface 242 to determine which data items to pre-populate in the run-time cache 212 and/or the persistent memory cache 206. In some embodiments, the data cache system 200 can interact with the other computing devices to increase or decrease the cache priorities associated respectively with the data items stored in the data cache system 200. For example, the data cache system 200 can communicate with peer cache systems, upstream cache systems, data centers, or any combination thereof. In some embodiments, the data cache system 200 can communicate with peer cache systems directly. In some embodiments, the data cache system 200 can communicate with peer cache system indirectly via an intermediary computing device (e.g., the network cache appliance 122 or the edge PoP 124).

Functional/logical components (e.g., applications, engines, modules, and databases) associated with the data cache system 200 can be implemented as circuitry, firmware, software, or other functional instructions. For example, the functional/logical components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional/logical components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional/logical components may operate individually and independently of other functional/logical components. Some or all of the functional/logical components may be executed on the same host device or on separate devices. The separate devices can be coupled through one or more communication channels (e.g., wireless or wired channel) to coordinate their operations. Some or all of the functional/logical components may be combined as one component. A single functional/logical component may be divided into sub-components, each sub-component performing separate method step or method steps of the single component.

In some embodiments, at least some of the functional/logical components share access to a memory space. For example, one functional/logical component may access data accessed by or transformed by another functional/logical component. The functional/logical components may be considered "coupled" to one another if they share a physical connection or a virtual connection, directly or indirectly, allowing data accessed or modified by one functional/logical component to be accessed in another functional/logical component. In some embodiments, at least some of the functional/logical components can be upgraded or modified remotely (e.g., by reconfiguring executable instructions that implements a portion of the functional/logical components).

The systems, engines, or devices described may include additional, fewer, or different functional/logical components for various applications.

Figure 3:
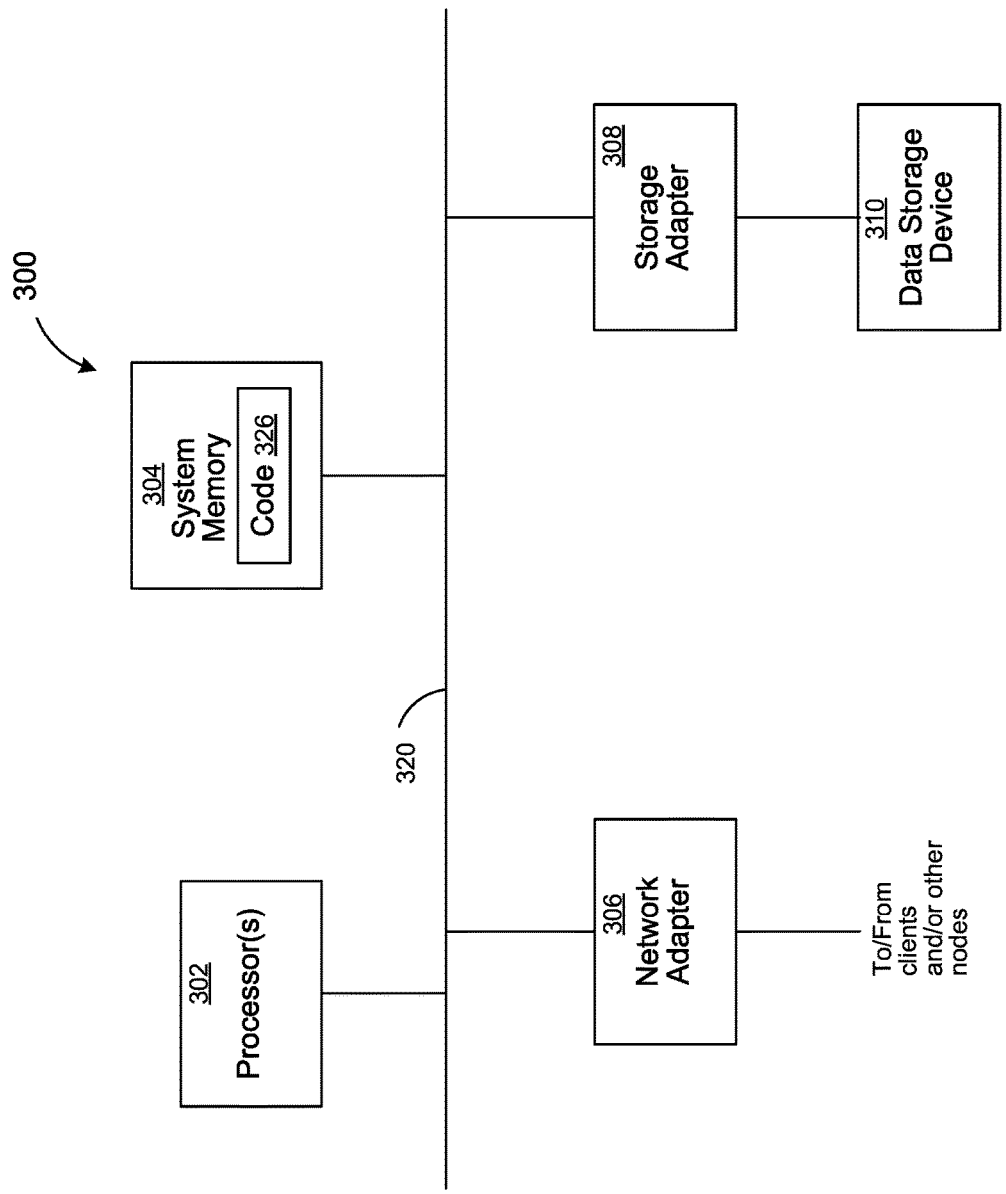
FIG. 3 is a block diagram illustrating a data cache system, in accordance with various embodiments.

FIG. 3 is a block diagram illustrating a data cache system 300, in accordance with various embodiments. The data cache system 200 can be the data cache system 300. The data cache system 300 can include one or more processors 302, a system memory 304, a network adapter 306, a storage adapter 308, and a data storage device 310. The one or more processors 302 and the system memory 304 can be coupled to an interconnect 320. The interconnect 320 can be one or more physical buses, point-to-point connections, virtual connections, bridges, adapters, controllers, or any combination thereof.

The processors 302 are the central processing units (CPUs) of the data cache system 300 and thus control the overall operation of the data cache system 300. In certain embodiments, the processors 302 accomplish this by executing software or firmware stored in the system memory 304. The processors 302 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or any combination of such devices.

The system memory 304 is or includes the main memory of the data cache system 300. The system memory 304 can provide run-time data storage shared by processes and applications implemented and/or executed by the one or more processors 302. The system memory 304 can include at least a random access memory (RAM) module or other volatile memory. In some embodiments, the system memory 304 can include other types of memory. In use, the system memory 304 may contain a code 326 containing instructions to execute one or more methods and/or functional/logical components described herein.

Also connected to the processors 302 through the interconnect 320 are the network adapter 306 and the storage adapter 308. The network adapter 306 provides the data cache system 300 with the ability to communicate with remote devices, over a network and may be, for example, an Ethernet adapter or Fibre Channel adapter. The network adapter 306 may also provide the data cache system 300 with the ability to communicate with other computers (e.g., in the same caching system/network). The client interface 222, the data source interface 240, and the pre-population interface 242 can communicate with their respective target external devices via the network adapter 306. The storage adapter 308 enables the data cache system 300 to access a persistent storage (e.g., the data storage device 310). The storage adapter 308 may be, for example, a Fibre Channel adapter or small computer system interface (SCSI) adapter. The storage adapter 308 can provide block level or file level access to the data storage device 310 (e.g., flash memory, solid state memory, hard disks, other persistent data storage memory, etc.). In some embodiments, the storage adapter 308 can provide only block level access to the data storage device 310.

The code 326 stored in system memory 304 may be implemented as software and/or firmware to program the processors 302 to carry out actions described above. In certain embodiments, such software or firmware may be initially provided to the data cache system 300 by downloading it from a remote system through the data cache system 300 (e.g., via network adapter 306).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Figure 4:
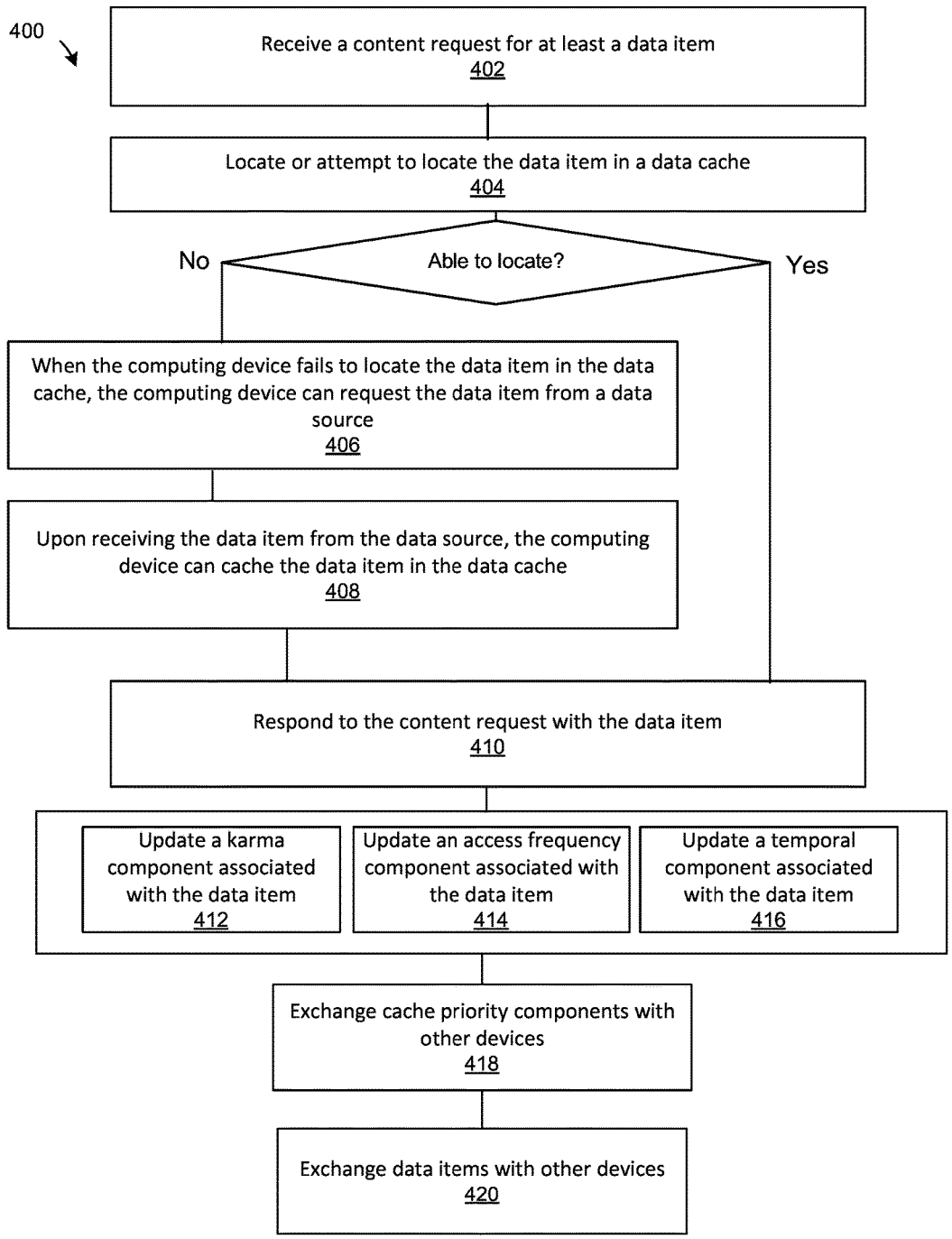
FIG. 4 is a flow diagram illustrating a method of operating a computing device to respond to a content request, in accordance with various embodiments.

FIG. 4 is a flow diagram illustrating a method 400 of operating a computing device (e.g., the data cache system 200 and/or the data cache system 300) to respond to a content request, in accordance with various embodiments. At block 402, the computing device receives a content request for at least a data item. The data item can be a video file, an image file, an audio file, a webpage, or any combination thereof. The content request can specify a temporary uniformed resource locator (URL) that expires within a preset period of time from the creation date of the URL.

The computing device can be the local hotspot system 110 or the ISP gateway system 116. The computing device can be in an ISP network at a client edge of a WAN, away from a point of presence (PoP) network and away from an origination database (e.g., the origination server 108) containing the data item. The computing device can be in a local computer network (e.g., established by the local hotspot system 110) connected to a backhaul link (e.g., the backhaul link 118) that provides access to the WAN for a requester device identified in the content request.

Responsive to the content request, the computing device at block 404 locates or attempts to locate the data item in a data cache (e.g., the run-time cache 212 and/or the persistent memory cache 206) implemented by a data storage device (e.g., the data storage device 310) in or coupled to the computing device. When the computing device fails to locate the data item in the data cache, the computing device can request, at block 406, the data item from a data source. At block 408, upon receiving the data item from the data source, the computing device can cache the data item in the data cache. Upon receiving the data item from the data source or locating the data item in the data cache, the computing device responds, at block 410, to the content request with the data item.

At blocks 412, 414, and 416, the computing device can update cache priority components associated with the requested data item. For example, at block 412, the computing device updates a karma component associated of the data item in response to the content request. The computing device can compute the karma component based on a requester-dependent karma score associated with an originator entity of the requested data item. The originator entity can be a user account in a social networking system. The karma component can be proportional to the requester-dependent karma score.

Figure 6:
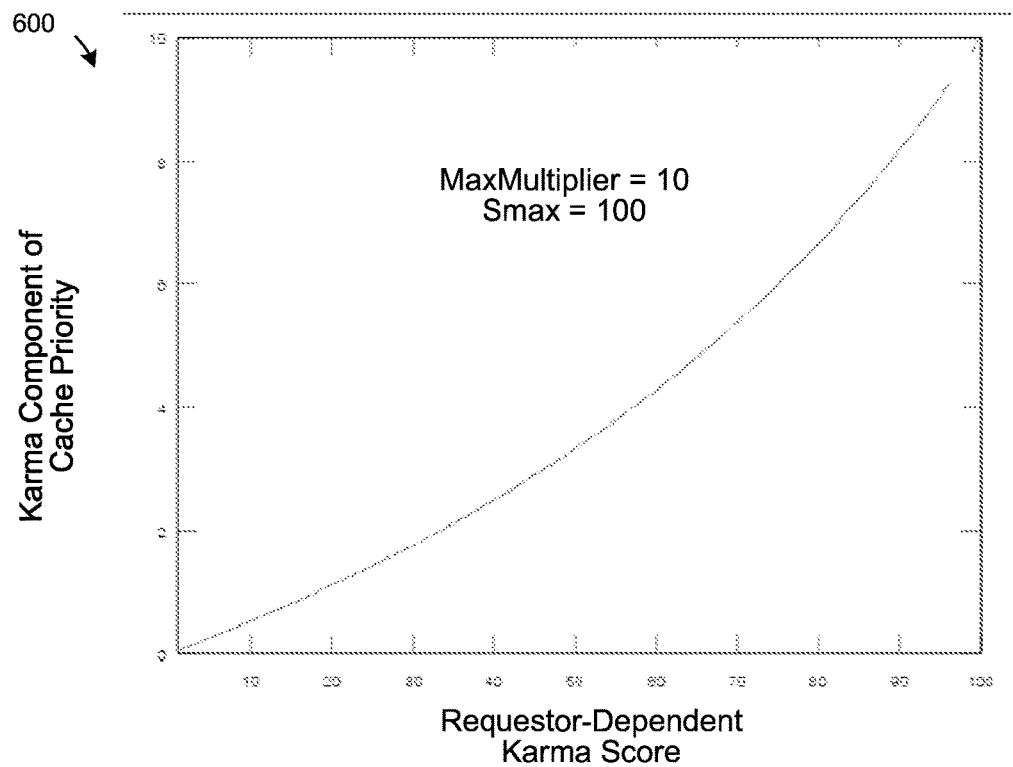
FIG. 6 is a graph diagram illustrating an expansion function of a karma component of a cache priority of a data item, in accordance with various embodiments.

For example, the karma component can be computed as illustrated in FIG. 6 and described immediately below. FIG. 6 is a graph diagram 600 illustrating an expansion function of a karma component of a cache priority of a data item, in accordance with various embodiments. The y-axis of the graph diagram illustrates potential values of the karma component. In this example, the karma component is computed as:

$$KarmaComponent = MaxMultiplier \times \frac{2}{\frac{Smax - KarmaScore}{Smax} + 1} - 1,$$

where the MaxMultiplier and Smax are preset constants, and the "KarmaScore" corresponds to the requester-dependent karma score. MaxMultiplier specifies the maximum value of the karma component. Smax specifies the maximum value of the requester-dependent karma score. As illustrated, the karma component increases from an initialized value (e.g., 1), and gradually increases to the full amount of the MaxMultiplier.

In some embodiments, the originator entity of a data item is the user account that uploaded the data item. In some embodiments, the originator entity of a data item is the user account that is associated with the creation of the data item. In some embodiments, the originator entity of a data item is the user account that first requested the data item. The computing device can track origination entities of data items in its data cache. The requester-dependent karma score can increase depending on the requester entity associated with the content request. In some embodiments, the computing device increases the requester-dependent karma score by a higher amount when the content request is not associated with the originator entity of the requested data item as compared to when the content request is associated with the originator entity. For example, the requester-dependent karma score would increase faster when more downloader who are not the uploader of the data item requests the data item.

In some embodiments, the karma score of a first data item corresponding to an uploader user account affects the karma score of the same uploader user for a second data item. In one example, a first user views/requests a data item, and a karma score of the first user grows. Next time when the first user uploads or views another video, the karma score of the first user is higher.

In one illustrative example, the requester-dependent karma score starts at 1 when initiated. The computing device can increase the requester-dependent karma score by 1 when the originator entity requests a data item that it uploaded and when the data cache has not yet cached the data item. The computing device can increase the requester-dependent karma score by 5 when the originator entity requests the data item from the data cache after the data item is saved in the data cache. The computing device can increase the requester-dependent karma score by 10 when someone else other than the originator entity requests the data item from the data cache after the data item is saved in the data cache after the data item is first requested by the originator entity.

In some embodiments, the requester-dependent karma score is specific to and associated with only the requested data item. In some embodiments, the requester-dependent karma score is associated with multiple data items. That is, the requester-dependent karma score can be shared amongst a plurality of data items from the same originator entity. For example, the computing device can receive another content request for another data item made available by the originator entity and increase the requester-dependent karma score used to compute the karma component of the data item based on the other content request.

At block 414, the computing device can update the access frequency component. The access frequency component is or is proportional to the number of times the data item is requested and/or downloaded. Most conventional caching algorithms rely only on either the number of times a data item is downloaded or most recent access time to determine a cache priority for retaining the data item in the data cache.

At block 416, the computing device can update a temporal component that decays completely within the preset period of time for the temporary URL measured from a starting time (e.g., time that the data item is first requested and cached in the data cache, first content request creation time, or the temporary URL creation time). Hence, the temporal component is proportional to a time duration of the cached data item. In one example, the computing device measures the time duration from the time the data item is downloaded into the data cache. In one example, the computing device identifies the request creation timestamp of the first content request for the data item as the starting time. In another example, the computing device measures the time duration from a timestamp attribute associated with the data item that indicates the URL creation time or the data item creation time.

The time duration advantageously provides a prediction of when the data item would likely become unavailable from the Internet or the WAN connected to the computing device. A temporary URL for specific types of Internet content (e.g., video or audio) is often configured to expire within a preset period of time from when the temporary URL is created. For example, a URL of a video in some data servers expires within two weeks. Hence, the likelihood that a data item would potentially be accessed decreases to zero after two weeks.

Figure 7:
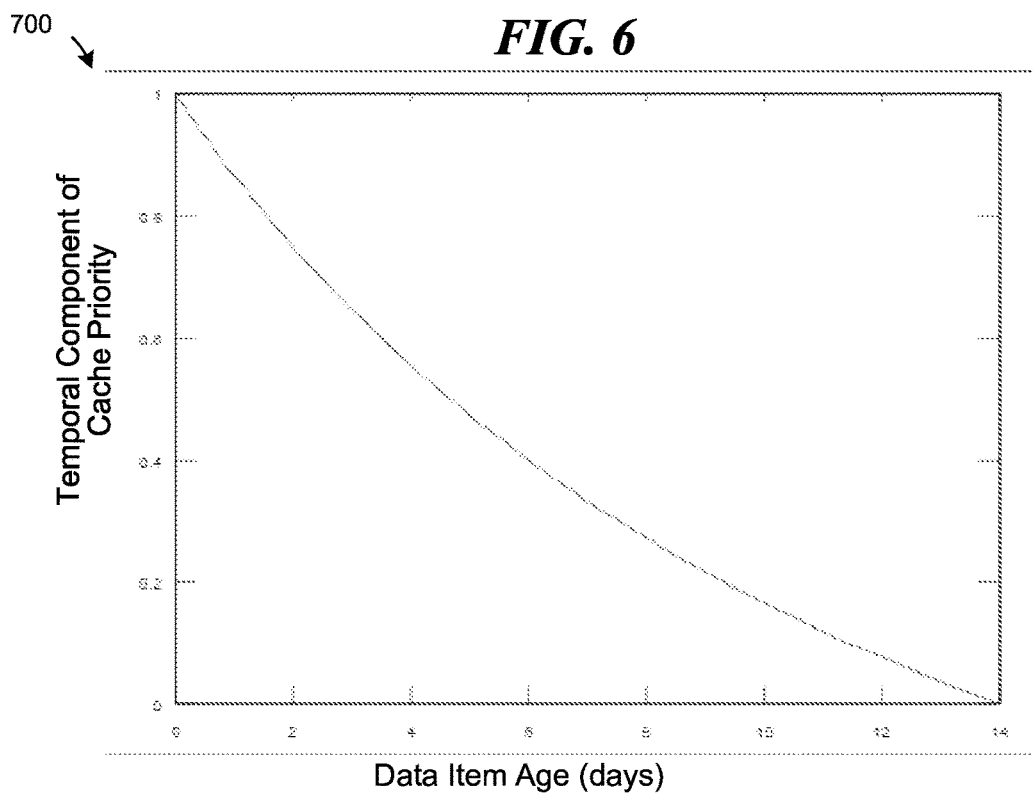
FIG. 7 is a graph diagram illustrating a decay function of a temporal component of a cache priority of a data item, in accordance with various embodiments.

In one illustrative example, the temporal component is equal to $$\frac{2}{\frac{T}{TMax}+1} - 1,$$

as illustrated in FIG. 7 and described in further detail below. FIG. 7 is a graph diagram 700 illustrating a decay function of a temporal component of a cache priority of a data item, in accordance with various embodiments. The y-axis illustrates the potential values of the temporal component. The x-axis illustrates the passing of time, e.g., measured from when the data item is first downloaded, from zero to a maximum time duration ("TMax"). TMax can corresponds to the maximum time duration that a temporary URL is active.

At block 418, the computing device can exchange cache priority components with other devices. For example, the computing device can send an identifier of the data item and at least one of the karma component, the access frequency component, the temporal component, or any combination thereof, to another computing device with another data cache. In another example, the computing device can update the cache priority components of a cached data item in the data cache based on an update message from another computing device. For example, the computing device can receive a second karma score associated with the originator entity from a second computing device. The computing device can then update the karma component based on the other karma score (e.g., by averaging or adding the two values). In yet another example, the computing device can receive one or more external cache priority components or external cache priority associated with a data item from another computing device. In response, the computing device updates the cache priority of the data item based on the external priority components or external cache priority.

At block 420, the computing device can receive exchange cache items with another computing device. For example, the computing device can receive a data item pre-population message from another data cache system (e.g., the network cache appliance 122, the edge pop 124, or a peer data cache system). The pre-population message can specify a suggestion for a data item. The data item pre-population message can contain the suggested data item or a URL/reference to the suggested data item. In embodiments where the pre-population message contains the suggested data item, the computing device can save the suggested data item into its data cache in response to the pre-population message. In embodiments where the pre-population message contains a reference to the suggested data item, the computing device downloads, according to the reference or URL, the suggested data item into its data cache. In some embodiments, the computing device can generate a pre-population message to suggest a data item to a peer data cache system.

In some embodiments, the computing device tracks one or more requestor identities associated with the content requests it receives. The computing device can provide the requestor identities to an external computing device. The computing device can receive one or more data item suggestions for the requestor identities from the external computing device for pre-population into the data cache.

Figure 5:
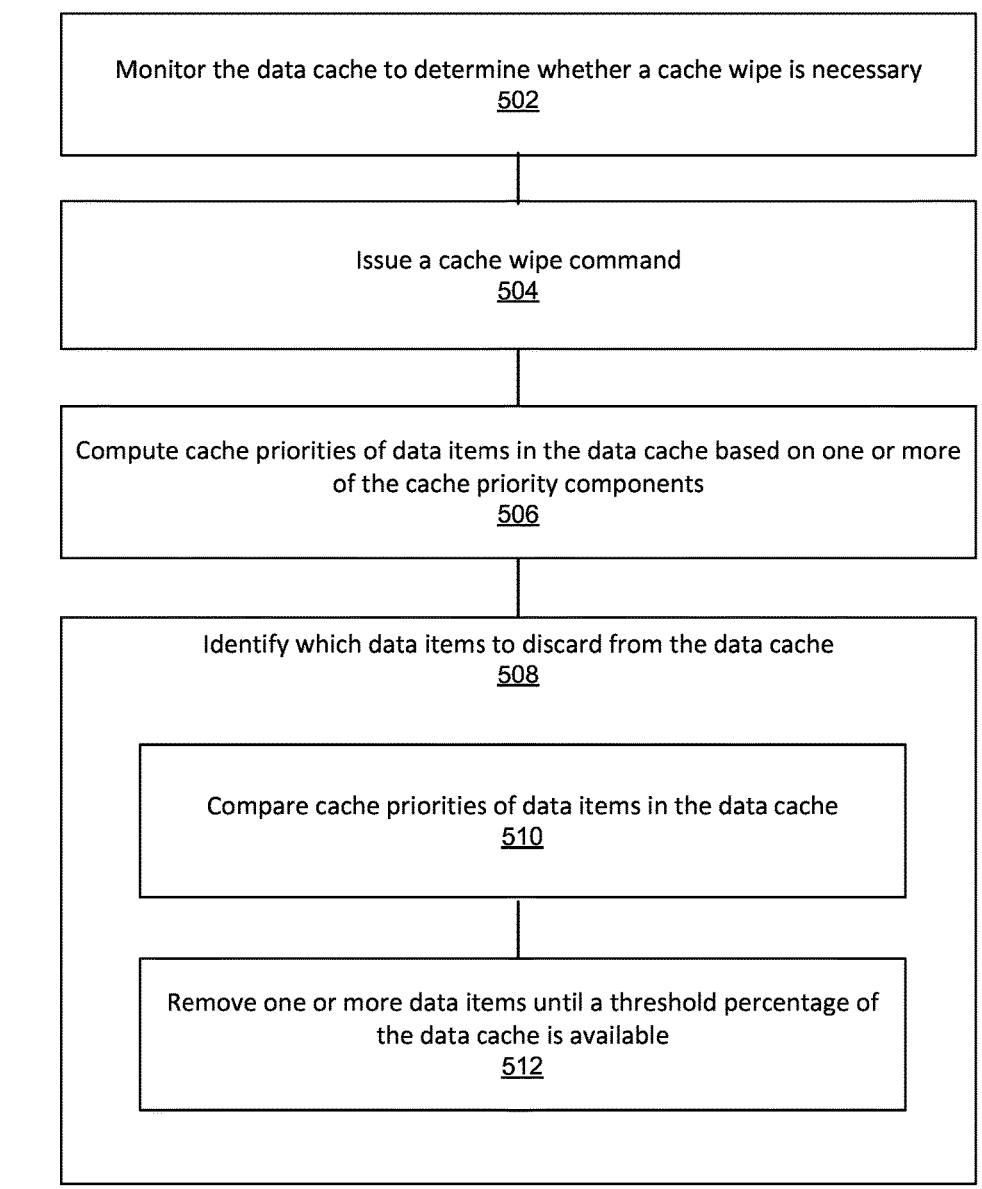
FIG. 5 is a flow diagram illustrating a method of maintaining cache capacity of a computing device, in accordance with various embodiments.

FIG. 5 is a flow diagram illustrating a method 500 of maintaining cache capacity of a computing device (e.g., the data cache system 200 and/or the data cache system 300), in accordance with various embodiments. The computing device can implement a data cache. At block 502, the computing device monitors the data cache to determine whether a cache wipe is necessary. For example, the computing device can detect that the data cache is within a threshold percentage of being full.

At block 504, the computing device initiates a cache wipe command in response to determining the cache wipe is necessary. At block 506, the computing device computes cache priorities of data items in the data cache based one or more of the cache priority components of each of the data items. For example, the computing device can compute a cache priority of a data item in the data cache based on at least on its karma component, its access frequency component, its temporal component, or any combination thereof. In another example, the computing device can compute the cache priority of the data item based on one or more of the cache priority components and the size of the data item. Computing the cache priority can be done regularly according to a preset schedule, in response to the cache wipe command, or in response to an update to at least one of the cache priority components.

In an illustrative example, the computing device computes the cache priority of the data item by multiplying the access frequency component (e.g., a number of times the data item is downloaded) by the karma component (e.g., spanning between 1 and a preset constant MaxMultiplier) and the temporal component (e.g., decaying from 1 to 0 within a preset period of time). In some embodiments, the karma component can have an upper range higher than an upper range of the temporal component. The cache priority can be computed as a product of the cache priority components, where the cache priority components are non-negative numbers. The karma component and the temporal component can be referred to as multipliers to the access frequency component.

At block 508, the computing device can identify which data items to discard from the data cache. Identifying which data items to discard can be in response to the cache wipe command. The computing device can determine whether to discard a data item from the data cache based on the cache priority computed at block 506. The computing device can discard data items with the lowest cache priorities. In some embodiments, the computing device selects a preset number of data items with the lowest cache priorities (e.g., lowest set with a size according to the preset number).

In several embodiments, the computing device removes/deletes data items with the lowest cache priorities instead of marking the data items for replacement. In other embodiments, the computing device marks data items with the lowest cache priorities for replacement. Embodiments that deletes directly advantageously obviate the need to maintain an index of potential memory replacement locations. For a network-edge data cache, that not have the computing resources of a sophisticated network appliance, removal of this memory requirement enables much simpler devices to serve as cache systems.

In some embodiments, the computing device discards data items with the lowest cache priorities one by one until a threshold percentage of the data cache is available. In some embodiments, the computing device discards a constant number of data items with the lowest cache priorities. For example, at sub-block 510, the computing device compares the cache priorities of the data items in the data cache. In some embodiments, the computing device can sort the data items according to their cache priorities. In some embodiments, the computation of the cache priorities (e.g., at block 506) and/or the sorting of the data items according to their cache priorities are performed regularly (e.g., according to a preset schedule or in response to content requests). At sub-block 512, the computing device can remove one or more data items until a threshold percentage (e.g., 80%) of the data cache is available. For example, at sub-block 512, the computing device can remove 20% of the data cache according to the cache priorities of the data items.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Some embodiments of the disclosure have other aspects, elements, features, and steps in addition to or in place of what is described above. These potential additions and replacements are described throughout the rest of the specification.

What is claimed is:

1. A computer-implemented method, comprising:
   receiving, at a data cache system, a content request for at least a data item, wherein the data cache system implements a data cache storing previously requested data items, pre-populated data items, or both;
   responsive to the content request, updating, by the data cache system, a karma score corresponding to an originator entity of the data item in an item index for the data cache, wherein the originator entity is a social network user account that uploaded the data item;
   computing, by the data cache system, a cache priority of the data item based at least on the karma score;
   in response to a cache wipe command, determining, by the data cache system, whether to discard the data item from the data cache based on the cache priority of the data item;
   in an event the data item is to be discarded, performing at least one of deleting the data item from the data cache or marking the data item for replacement in the data cache; and
   in an event the data item is not to be discarded, refraining from discarding the data item.

2. The computer-implemented method of claim 1, wherein the content request specifies a temporary uniformed resource locator (URL) that expires within a preset period of time; and wherein computing the cache priority is further based on a temporal component that decays completely within the preset period of time from when the data item is downloaded into the data cache system from an external data source.

3. The computer-implemented method of claim 1, wherein updating the karma score includes increasing the karma score by a higher amount when the content request is not associated with the originator entity than when the content request is associated with the originator entity.

4. The computer-implemented method of claim 1, wherein determining
   whether to discard the data item comprises:
   comparing cache priorities of data items in the data cache to determine a ranking of the data items in accordance with the cache priorities; and
   determining whether to discard the data item based on a rank of the data item in the ranking.

5. The computer-implemented method of claim 4, wherein determining whether to discard the data item includes determining whether the data item has the lowest rank in the ranking.

6. The computer-implemented method of claim 1, further comprising:
   detecting that the data cache is within a threshold percentage of being full; and
   in response to said detecting, initiating the cache wipe command.

7. The computer-implemented method of claim 1, further comprising:
   in response to the cache wipe command, discarding one or more data items until a threshold percentage of the data cache is available.

8. The computer-implemented method of claim 1, further comprising:
   discarding a target data item having a lowest cache priority amongst data items in the data cache.

9. The computer-implemented method of claim 1, wherein computing the cache priority is further based on a number of times the data item is requested from the data cache and a temporal component that decays over a preset period of time from when the data item is downloaded into the data cache.

10. The computer-implemented method of claim 1, wherein computing the cache priority is further based on a size of the data item.

11. The computer-implemented method of claim 1, further comprising computing a karma component based on the karma score; wherein the karma component increases proportional to an increasing of the karma score up to a preset maximum; and wherein the computed cache priority of the data item is proportional to the karma component.

12. The computer-implemented method of claim 11, wherein computing the cache priority comprises multiplying an access frequency of the data item being requested from the data cache by the karma component and a temporal component that decays from one to zero within a preset period of time from when the data item is downloaded into the data cache.

13. The computer-implemented method of claim 12, wherein the karma component has a minimum value of one.

14. The computer-implemented method of claim 12, further comprising sending an identifier of the data item and at least one of the karma component, the access frequency, or the temporal component, to another data cache system.

15. The computer-implemented method of claim 1, further comprising:
    receiving one or more external cache priority components or external cache priority associated with the data item from another computing device; and
    updating the cache priority of the data item based on the external priority components or external cache priority.

16. The computer-implemented method of claim 1, wherein the data cache system is in an Internet service provider (ISP) network behind a backhaul link to a wide area network (WAN), away from a point of presence (PoP) network and away from an origination database containing the data item.

17. The computer-implemented method of claim 1, further comprising:
    tracking a requestor identity in the data cache system based on the content request;
    providing one or more requestor identities including the requestor identity to an external computing device; and
    receiving a data item suggestion for the requestor identities from the external computing device for pre-population into the data cache.

18. The computer-implemented method of claim 1, further comprising:
    receiving another content request for another data item made available by the originator entity; and
    increasing the karma score of the data item based on the other content request.

19. A data cache system, comprising:
    a data storage configured to implement a data cache and an item index for the data cache;
    a network interface configured to receive a content request for at least a data item; and
    a processor configured to:
    responsive to the content request, update a karma score corresponding to an originator entity of the data item in the item index, wherein the originator entity is a social network user account that uploaded the data item;
    compute a cache priority of the data item based at least on the karma score;
    in response to a cache wipe command, determine whether to discard the data item from the data cache based on the cache priority of the data item;
    in an event the data item is to be discarded, perform at least one of deleting the data item from the data cache or marking the data item for replacement in the data cache; and
    in an event the data item is not to be discarded, refrain from discarding the data item.

20. A non-transitory computer readable medium storing instructions that, when executed by a processor, cause the processor to:
    implement a data cache storing previously requested data items for a data cache system;
    responsive to a content request for at least a data item, update a karma score corresponding to an originator entity of the data item, wherein the originator entity is a social network user account that uploaded the data item;
    compute a cache priority of the data item based at least on the karma score;
    in response to a cache wipe command, determine whether to discard the data item from the data cache based on the cache priority of the data item;
    in an event the data item is to be discarded, perform at least one of deleting the data item from the data cache or marking the data item for replacement in the data cache; and
    in an event the data item is not to be discarded, refrain from discarding the data item.

* * * * *